US011307038B2

(12) United States Patent
Liu et al.

(10) Patent No.: US 11,307,038 B2
(45) Date of Patent: Apr. 19, 2022

(54) METHOD AND DEVICE FOR ACQUIRING ROAD TRACK, AND STORAGE MEDIUM

(71) Applicant: Baidu Online Network Technology (Beijing) Co., Ltd., Beijing (CN)

(72) Inventors: Xianming Liu, Beijing (CN); Yan Zeng, Beijing (CN); Yaoduan Liang, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 402 days.

(21) Appl. No.: 16/297,015

(22) Filed: Mar. 8, 2019

(65) Prior Publication Data

US 2019/0376796 A1  Dec. 12, 2019

(30) Foreign Application Priority Data

Jun. 6, 2018 (CN) .......................... 201810575995.2

(51) Int. Cl.
| | |
|---|---|
| *G01C 21/30* | (2006.01) |
| *G01C 21/14* | (2006.01) |
| *G01C 22/00* | (2006.01) |
| *G01S 19/48* | (2010.01) |
| *G06V 20/56* | (2022.01) |

(52) U.S. Cl.
CPC .............. *G01C 21/30* (2013.01); *G01C 21/14* (2013.01); *G01C 22/00* (2013.01); *G01S 19/48* (2013.01); *G06V 20/56* (2022.01)

(58) Field of Classification Search
CPC ........ G01C 21/30; G01C 21/14; G01C 22/00; G01S 19/48; G06K 9/00791
See application file for complete search history.

(56) References Cited

U.S. PATENT DOCUMENTS

| | | | | |
|---|---|---|---|---|
| 7,693,654 | B1* | 4/2010 | Dietsch | G01C 21/20 |
| | | | | 701/461 |
| 8,320,939 | B1* | 11/2012 | Vincent | G01S 19/48 |
| | | | | 455/456.1 |
| 10,482,003 | B1* | 11/2019 | Bondor | B60W 60/00 |
| 10,623,897 | B1* | 4/2020 | Wu | H04W 4/025 |
| 2014/0270345 | A1 | 9/2014 | Gantman | |
| 2015/0279213 | A1* | 10/2015 | Balter | G01C 21/36 |
| | | | | 705/13 |
| 2016/0253806 | A1 | 9/2016 | Iimura | |
| 2019/0258737 | A1* | 8/2019 | Wang | G06F 16/29 |

(Continued)

FOREIGN PATENT DOCUMENTS

| | | |
|---|---|---|
| CN | 105044757 A | 11/2015 |
| CN | 205537683 U | 8/2016 |
| CN | 107229063 A | 10/2017 |

(Continued)

*Primary Examiner* — Hussein Elchanti
(74) *Attorney, Agent, or Firm* — Nixon Peabody LLP (57) ABSTRACT

The present disclosure discloses a method and device for acquiring a road track, and a storage medium. The method includes: acquiring, by a visual odometer, when moving in a collecting area, coordinate information of a location of the visual odometer in real time, and the collecting area being an area where GNSS signals are blocked; and sending, by the visual odometer, the coordinate information to a second device, causing the second device to generate a road track in the collecting area according to the acquired coordinate information.

14 Claims, 7 Drawing Sheets

(56) References Cited

U.S. PATENT DOCUMENTS

2019/0272446 A1\* 9/2019 Kangaspunta ....... G05D 1/0212
2020/0080860 A1\* 3/2020 Huang ................. G01C 21/367

FOREIGN PATENT DOCUMENTS

| CN | 107656545 A | 2/2018 |
|----|----|----|
| CN | 107728175 A | 2/2018 |
| CN | 107796391 A | 3/2018 |
| WO | WO 2012/151333 A2 | 11/2012 |

\* cited by examiner

METHOD AND DEVICE FOR ACQUIRING ROAD TRACK, AND STORAGE MEDIUM

CROSS-REFERENCE TO RELATED APPLICATIONS

This application claims priority to Chinese Patent Application No. 201810575995.2, filed on Jun. 6, 2018, titled "Method and device for acquiring road track, and storage medium," which is hereby incorporated by reference in its entirety.

TECHNICAL FIELD

The present disclosure relates to computer application technologies, specifically to a method and device for acquiring a road track, and a storage medium.

BACKGROUND

At present, when collecting road data, a bicycle or automobile is usually used for performing the related collection operations.

A Global Navigation Satellite System (GNSS) positioning device may be installed on the bicycle or automobile to receive satellite signals in real time. The strength of the satellite signals is directly dependent on the surrounding environment, and the complexity of the surrounding environment directly affects the positioning accuracy.

For some areas where the GNSS signals are blocked, such as internal parks of a residential area, and underground parking lots, if a general GNSS positioning device is used, the positioning accuracy may be low, and even situations that the positioning cannot be performed will occur.

Therefore, in the existing technology, an integrated navigation device is proposed. However, the implementation cost of this method is relatively high. In addition, after the GNSS signal lock-lose time becomes longer, the positioning accuracy may also reduce, and finally the collected road tracks cannot be linked to the existing road network.

SUMMARY

In view of this, the present disclosure provides a method and device for acquiring a road track, and a storage medium.

The specific technical solution is as follows.

A method for acquiring a road track, including: acquiring, by a visual odometer, when moving in a collecting area, coordinate information of a location of the visual odometer in real time, the collecting area being an area where GNSS signals are blocked; and sending, by the visual odometer, causing the coordinate information to a second device, so that the second device generates a road track in the collecting area based on the coordinate information.

According to a preferred embodiment of the present disclosure, the acquiring, by a visual odometer, coordinate information of a location of the visual odometer in real time includes: acquiring, by the visual odometer, a spatial relative coordinate of the location of the visual odometer in real time; and the sending, by the visual odometer, the coordinate information to a second device includes: sending, by the visual odometer, the spatial relative coordinate to the second device, causing the second device to convert the spatial relative coordinate into a geodetic coordinate, and generate, according to the converted geodetic coordinate, the road track in the collecting area.

According to a preferred embodiment of the present disclosure, the acquiring, by a visual odometer, coordinate information of a location of the visual odometer in real time includes: acquiring, by the visual odometer, a spatial relative coordinate of the location of the visual odometer in real time, and converting the spatial relative coordinate into a geodetic coordinate in real time; and the sending, by the visual odometer, the coordinate information to a second device includes: sending, by the visual odometer, the geodetic coordinate to the second device, causing the second device to generate, according to the geodetic coordinate, the road track in the collecting area.

According to a preferred embodiment of the present disclosure, the acquiring, by a visual odometer, coordinate information of a location in real time includes: acquiring, by the visual odometer, coordinate information of positions located between a set starting point and an ending point in real time.

According to a preferred embodiment of the present disclosure, the converting the spatial relative coordinate into a geodetic coordinate includes: converting the spatial relative coordinate into the geodetic coordinate in real time according to the set starting point and a set starting direction.

A method for acquiring a road track, including: acquiring, by a second device, coordinate information from a visual odometer, the coordinate information being coordinate information of a location of the visual odometer acquired by the visual odometer in real time when moving in a collecting area, and the collecting area being an area where GNSS signals are blocked; and generating, by the second device, a road track in the collecting area according to the coordinate information.

According to a preferred embodiment of the present disclosure, the acquiring, by a second device, coordinate information from a visual odometer includes: acquiring, by the second device, a spatial relative coordinate from the visual odometer; and the generating, by the second device, a road track in the collecting area according to the coordinate information includes: converting, by the second device, the spatial relative coordinate into a geodetic coordinate, and generating, according to the converted geodetic coordinate, the road track in the collecting area.

According to a preferred embodiment of the present disclosure, the acquiring, by a second device, coordinate information from a visual odometer includes: acquiring, by the second device, a geodetic coordinate from the visual odometer, wherein the geodetic coordinate is acquired by obtaining by the visual odometer a spatial relative coordinate of the location of the visual odometer, and converting by the visual odometer the spatial relative coordinate into the geodetic coordinate in real time, and then sent to the second device; and the generating, by the second device, a road track in the collecting area according to the coordinate information includes: generating, by the second device, according to the geodetic coordinate, the road track in the collecting area.

A device for acquiring a road track, including: a first acquiring unit and an information sending unit; wherein the first acquiring unit is configured to acquire, when moving in a collecting area, coordinate information of a location of the device in real time, the collecting area being an area where GNSS signals are blocked; and the information sending unit is configured to send the coordinate information to a second device, cause the second device to generate a road track in the collecting area according to the coordinate information.

According to a preferred embodiment of the present disclosure, the first acquiring unit is configured to acquire a spatial relative coordinate of the location of the device in real time; and the information sending unit is configured to send, the spatial relative coordinate to the second device, cause the second device to convert the spatial relative coordinate into a geodetic coordinate, and generate, according to the converted geodetic coordinate, the road track in the collecting area.

According to a preferred embodiment of the present disclosure, the first acquiring unit is configured to acquire a spatial relative coordinate of the location of the device in real time, and convert the spatial relative coordinate into a geodetic coordinate in real time; and the information sending unit is configured to send the geodetic coordinate to the second device, cause the second device to generate, according to the geodetic coordinate, the road track in the collecting area.

According to a preferred embodiment of the present disclosure, the first acquiring unit is configured to acquire, coordinate information of positions located between a set starting point and an ending point in real time.

According to a preferred embodiment of the present disclosure, the first acquiring unit is configured to convert the spatial relative coordinate into the geodetic coordinate in real time according to the set starting point and a set starting direction.

A device for acquiring a road track, the device including: a second acquiring unit and a track generating unit; wherein the second acquiring unit is configured to acquire coordinate information from a visual odometer, the coordinate information being coordinate information of a location of the visual odometer acquired by the visual odometer in real time when moving in a collecting area, and the collecting area being an area where GNSS signals are blocked; and the track generating unit is configured to generate a road track in the collecting area according to the coordinate information.

According to a preferred embodiment of the present disclosure, the second acquiring unit is configured to acquire a spatial relative coordinate from the visual odometer; and the track generating unit is configured to convert, the spatial relative coordinate into a geodetic coordinate, and generate, according to the converted geodetic coordinate, the road track in the collecting area.

According to a preferred embodiment of the present disclosure, the second acquiring unit is configured to acquire a geodetic coordinate from the visual odometer, wherein the geodetic coordinate is acquired by obtaining by the visual odometer a spatial relative coordinate of the location of the visual odometer, and converting by the visual odometer the spatial relative coordinate into the geodetic coordinate in real time, and then sent to the second device; and the track generating unit is configured to generate, according to the geodetic coordinate, the road track in the collecting area.

A computer device, including a memory, a processor, and a computer program stored on the memory and capable of operating on the processor, wherein when the processor executes the program, implements the method as described above.

A computer readable storage medium, storing a computer program thereon, wherein the computer program, when executed by a processor, implements the method as described above.

Based on the above description, it can be seen that by adopting the solution of the present disclosure, in an area where GNSS signals are blocked, a visual odometer in the moving state may be used to acquire coordinate information of the location of the visual odometer in real time, and then the coordinate information may be sent to a second device, so that the second device generates a road track in the area where GNSS signals are blocked according to the acquired coordinate information. Compared to the existing technology, an integrated navigation device or the like is not needed in the solution of the present disclosure, thereby reducing the implementation costs. The road track in the area where GNSS signals are blocked may be acquired by the visual odometer, thereby improving the positioning accuracy, so that the collected road track can be linked to the existing road network.

DETAILED DESCRIPTION OF EMBODIMENTS

In view of the problems in the prior art, a method for acquiring a road track by a visual odometer is proposed in the present disclosure.

In order to make the technical solution of the present disclosure clearer, the solution of the present disclosure is further described below with reference to the accompanying drawings and the embodiments.

It is apparent that the described embodiments are part of the embodiments of the present disclosure, rather than all of the embodiments. All other embodiments obtained by those skilled in the art based on the embodiments of the present disclosure without creative efforts are within the scope of the present disclosure.

Figure 1:
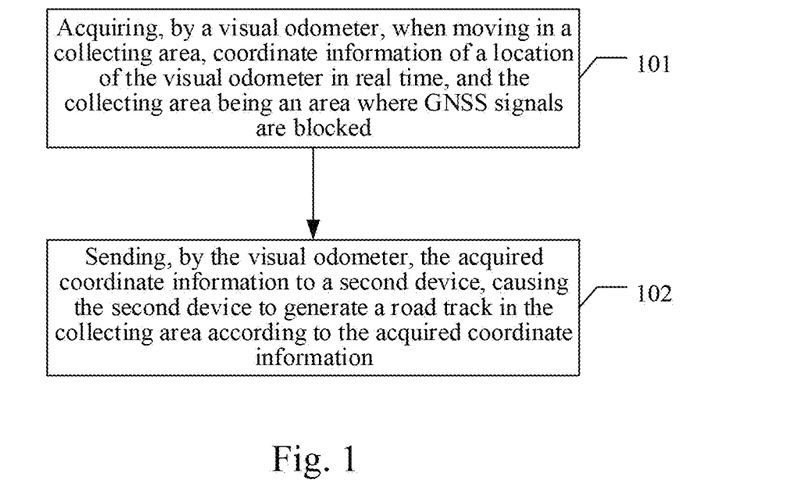
FIG. 1 is a flowchart of a first embodiment of a method for acquiring a road track according to the present disclosure.

FIG. 1 is a flowchart of a first embodiment of a method for acquiring a road track according to the present disclosure. As shown in FIG. 1, the following specific implementations are included.

In step 101, acquiring, by a visual odometer, when moving in a collecting area, coordinate information of a location of the visual odometer in real time, the collecting area being an area where GNSS signals are blocked.

In step 102, sending, by the visual odometer, the acquired coordinate information to a second device, causing the second device to generate a road track in the collecting area according to the acquired coordinate information.

In the process of collecting road data by a bicycle or automobile, when entering an area where GNSS signals are blocked, a starting point and a starting direction may be set, and the visual odometer is started to start collecting.

The setting (selection) method of the starting point may be as follows: selecting the starting point based on positioning information acquired under the condition that the GNSS signal is good, such as determining a GNSS track point latest collected under the condition that the GNSS signal is good as the starting point, or manually selecting a point having a clear identifier on a map as the starting point.

In addition, an arrow symbol may be used to indicate a direction to walk on the map, that is, to indicate the starting direction.

Assuming that the vehicle is used for collecting road data, the visual odometer may be located at a certain position of the automobile, and the visual odometer is moved by the moving of the automobile. When moving in the collecting area, the visual odometer may acquire the coordinate information of the location of itself in real time, and the collecting area refers to the area where GNSS signals are blocked.

Specifically, the visual odometer may acquire the spatial relative coordinate of the location of itself in real time according to the prior art, the spatial relative coordinate is in units of meters, and generally refers to information of amount of change relative to the starting point, including numerical changes and direction changes, and the like.

The visual odometer may convert the acquired spatial relative coordinate into a geodetic coordinate in real time. Since the geodetic coordinate of the starting point is knowable, and the spatial relative coordinate represents the amount of change relative to the starting point, then based on the starting point and the starting direction, the spatial relative coordinate may be conveniently converted into the geodetic coordinate, which is embodied in the prior art.

When the GNSS signal becomes better, such as when leaving the area where GNSS signals are blocked, the ending point may be set (selected). The selecting method may be as follows: determining a GNSS track point latest collected under the condition that the GNSS signal is good as the ending point, or manually selecting a point having clear identifier on the map as the ending point, or the like.

According to the selecting of the ending point, the visual odometer ends its own processing, that is, the visual odometer may acquire the spatial relative coordinates of the positions between the starting point and the ending point in real time, and convert the acquired spatial relative coordinates into geodetic coordinates in real time.

The visual odometer may send the acquired geodetic coordinate each time to the second device, and the second device refers to another specified device different from the visual odometer. The second device is not specifically limited, depending on the actual situation. Correspondingly, the second device may generate a road track in the collecting area according to the acquired geodetic coordinate.

In the above description, after the visual odometer acquires the spatial relative coordinate, the visual odometer performs the coordinate conversion, and sends the converted geodetic coordinate to the second device.

Alternatively, the visual odometer may also directly send the acquired spatial relative coordinate to the second device, cause the second device to perform the coordinate conversion operation, and the conversion method remains unchanged. Specifically, which method may be used depends on actual needs.

Figure 2:
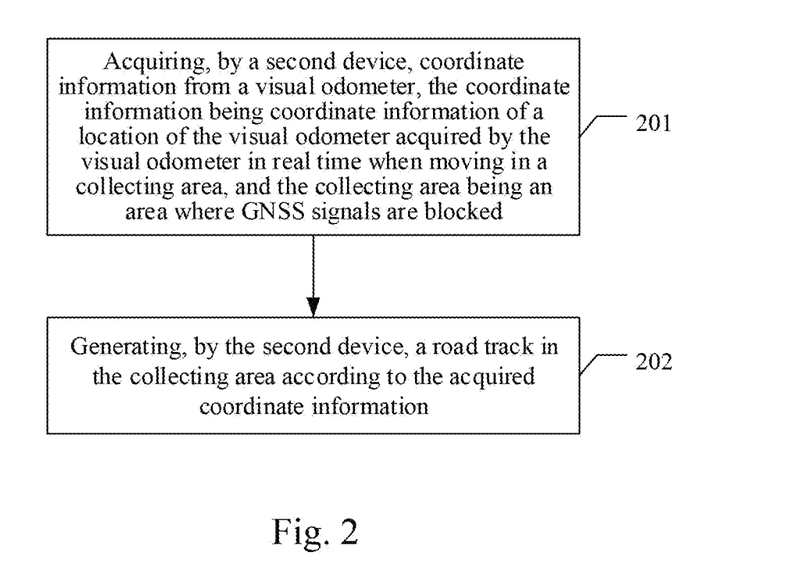
FIG. 2 is a flowchart of a second embodiment of the method for acquiring a road track according to the present disclosure.

FIG. 2 is a flowchart of a second embodiment of the method for acquiring a road track according to the present disclosure. As shown in FIG. 2, the following specific implementations are included.

In step 201, acquiring, by a second device, coordinate information from a visual odometer, the coordinate information being coordinate information of a location of the visual odometer acquired by the visual odometer in real time when moving in a collecting area, the collecting area being an area where GNSS signals are blocked.

In step 202, generating, by the second device, a road track in the collecting area according to the acquired coordinate information.

The present embodiment may specifically implemented by the following two methods.

The First Method

Acquiring, by the second device, a spatial relative coordinate from the visual odometer; converting, by the second device, the acquired spatial relative coordinate into a geodetic coordinate; and generating, by the second device, according to the converted geodetic coordinate, the road track in the collecting area, i.e., the area where GNSS signals are blocked.

The Second Method

Acquiring, by the second device, a geodetic coordinate from the visual odometer, where the geodetic coordinate is acquired by obtaining by the visual odometer a spatial relative coordinate of the location of the visual odometer, and converting by the visual odometer the spatial relative coordinate into the geodetic coordinate in real time, and then sent to the second device; and generating, by the second device, according to the acquired geodetic coordinate, the road track in the collecting area, i.e., the area where GNSS signals are blocked.

The road track in the area where GNSS signals are blocked acquired by the above method may be combined with the road track in the area where GNSS signals are unblocked, i.e., the GNSS track, acquired according to the prior art, thereby obtaining a complete road track, so as to link to the existing road network.

Figure 3:
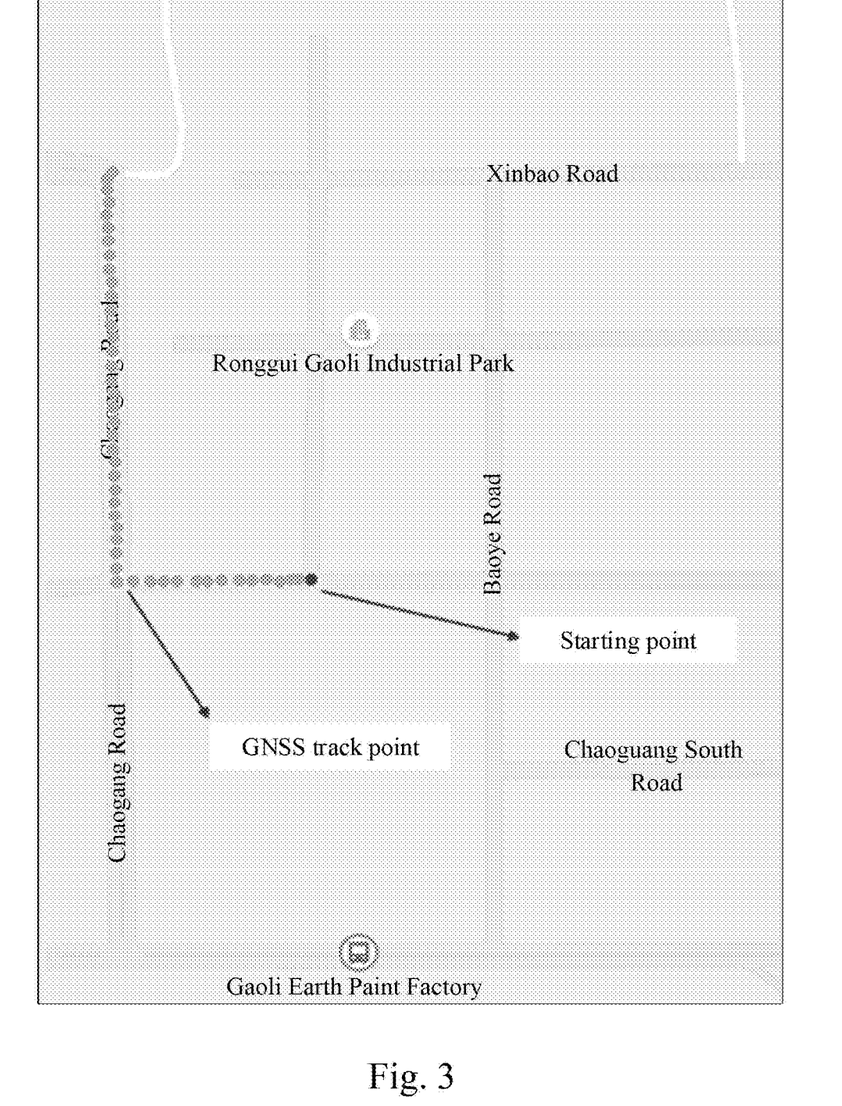
FIG. 3 is a schematic diagram of a set starting point according to the present disclosure.

Based on the above introduction, FIG. 3 is a schematic diagram of a set starting point according to the present disclosure. One may manually select a point having a clear identifier on the map as the starting point, or the like.

Figure 4:
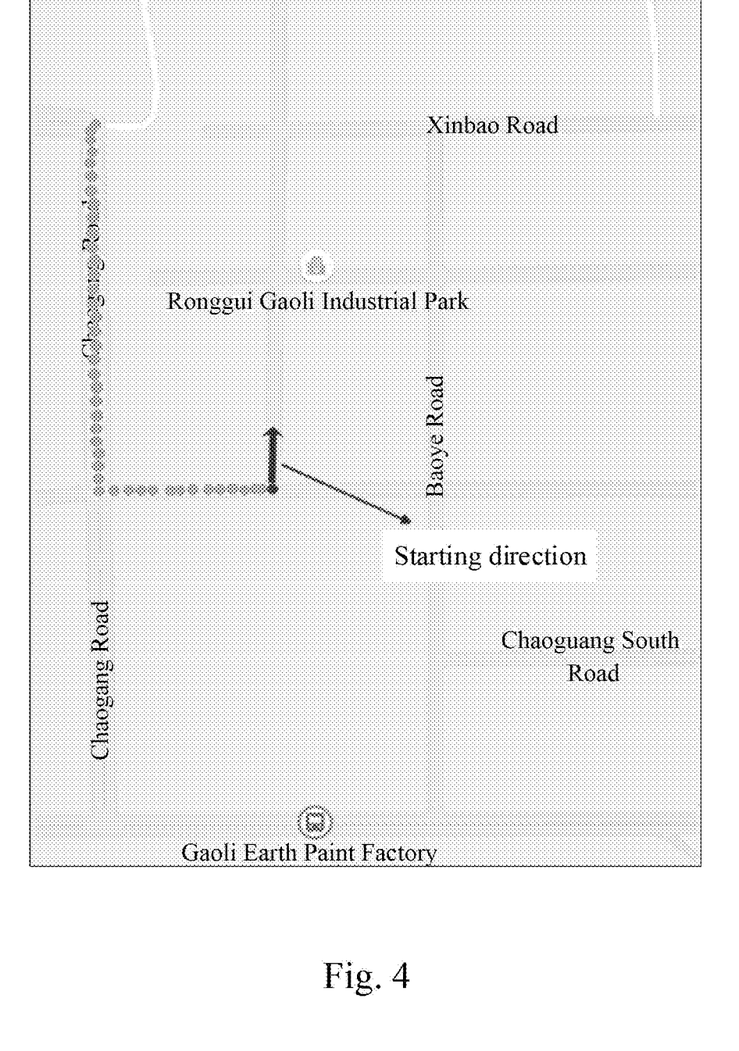
FIG. 4 is a schematic diagram of a set starting direction according to the present disclosure.

FIG. 4 is a schematic diagram of a set starting direction according to the present disclosure. An arrow symbol may be used to indicate a direction to walk on the map, that is, the starting direction.

Figure 5:
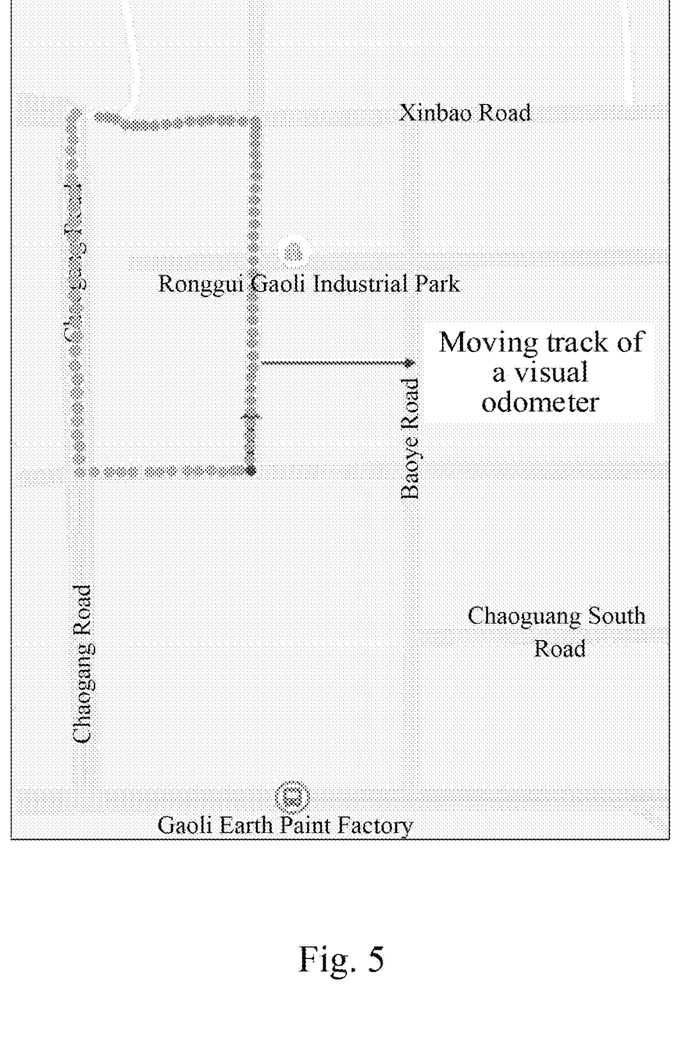
FIG. 5 is a schematic diagram of a moving track of a visual odometer according to the present disclosure.
Figure 6:
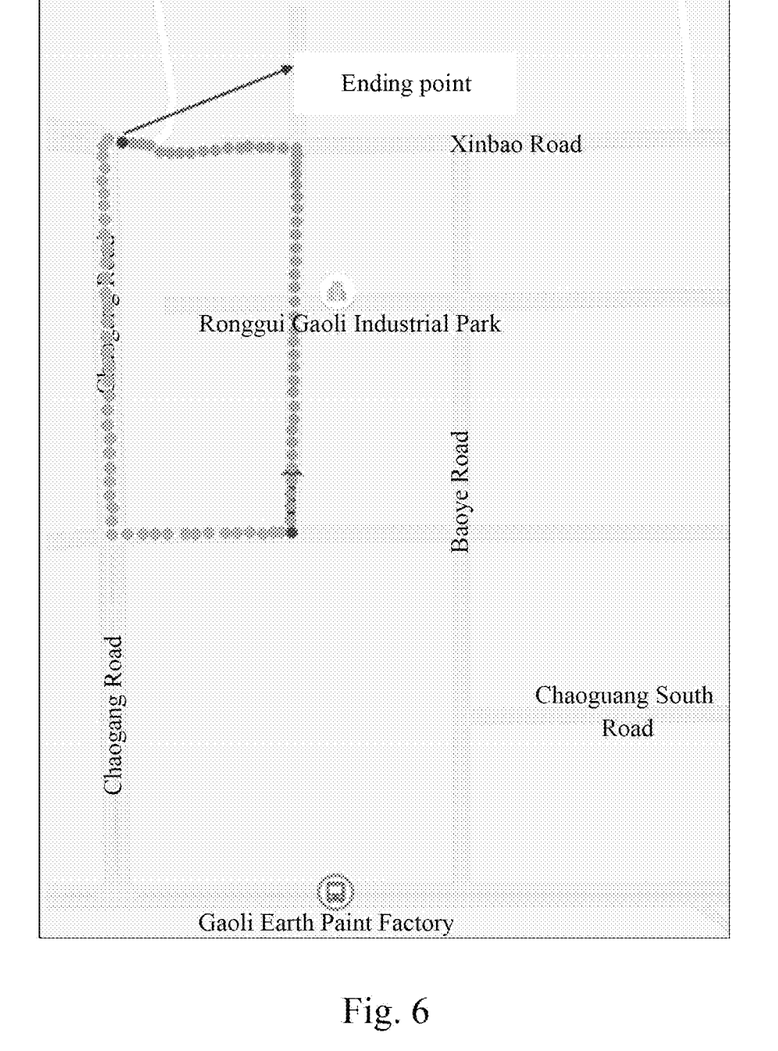
FIG. 6 is a schematic diagram of a set ending point according to the present disclosure.

FIG. 5 is a schematic diagram of a moving track of a visual odometer according to the present disclosure. FIG. 6 is a schematic diagram of a set ending point according to the present disclosure. One may manually select a point having a clear identifier on the map as the ending point, or the like.

It should be noted that, for the foregoing method embodiments, for the ease of description, they are expressed as a series of action combinations, but those skilled in the art should understand that the present disclosure is not limited by the described action sequence, according to the present disclosure, certain steps may be performed in other sequences or concurrently. Secondly, those skilled in the art should also understand that the embodiments described in the specification are all preferred embodiments, and the actions and modules involved are not necessarily required by the present disclosure.

In the above embodiments, the descriptions of the various embodiments are different, and the details that are not detailed in a certain embodiment may be referred to the related descriptions of other embodiments.

In summary, according to the solution described in the foregoing method embodiments, in an area where GNSS signals are blocked, a visual odometer in the moving state may be used to acquire coordinate information of the location of the visual odometer in real time, and then the coordinate information may be sent to a second device, so that the second device generates a road track in the area where GNSS signals are blocked according to the acquired coordinate information. Compared to the existing technology, an integrated navigation device or the like is not needed in the solution described in the foregoing method embodiments, thereby reducing the implementation costs. In addition, the road track in the area where GNSS signals are blocked may be acquired by the visual odometer, thereby improving the positioning accuracy, so that the collected road track can be linked to the existing road network.

The above is a description of the method embodiments, and the solution of the present disclosure is further described below with the device embodiments.

Figure 7:
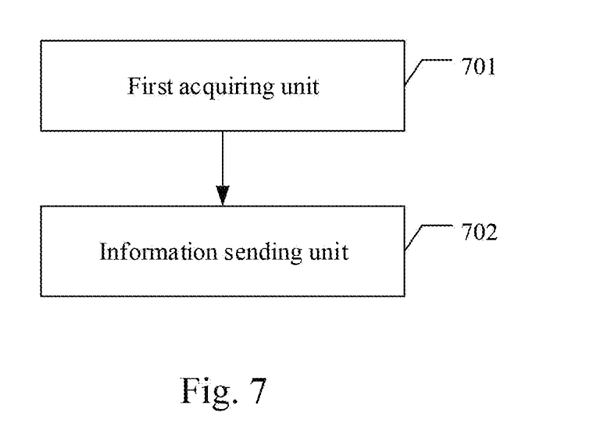
FIG. 7 is a schematic structural diagram of composition of a device for acquiring a road track according to a first embodiment of the present disclosure.

FIG. 7 is a schematic structural diagram of composition of a first embodiment of a device for acquiring a road track according to the present disclosure. As shown in FIG. 7, the device includes a first acquiring unit 701 and an information sending unit 702.

The first acquiring unit 701 is configured to acquire, when moving in a collecting area, coordinate information of a location of the device in real time, the collecting area being an area where GNSS signals are blocked.

The information sending unit 702 is configured to send the acquired coordinate information to a second device, cause the second device to generate a road track in the collecting area according to the acquired coordinate information.

In practical applications, the device for acquiring a road track shown in FIG. 7 may be a visual odometer.

In the process of collecting road data by a bicycle or automobile, when entering an area where GNSS signals are blocked, a starting point and a starting direction may be set, and the visual odometer is started to start collecting.

The setting (selection) method of the starting point may be as follows: selecting the starting point based on positioning information acquired under the condition that the GNSS signal is good, such as determining a GNSS track point latest collected under the condition that the GNSS signal is good as the starting point, or manually selecting a point having a clear identifier on a map as the starting point, or the like.

In addition, an arrow symbol may be used to indicate a direction to walk on the map, that is, to indicate the starting direction.

Assuming that the automobile is used for collecting road data, the visual odometer may be located at a certain position of the automobile, and the visual odometer is moved by the moving of the automobile. When moving in the collecting area, the visual odometer may acquire the coordinate information of the location of the visual odometer in real time, and the collecting area refers to the area where GNSS signals are blocked.

Specifically, the first acquiring unit 701 may acquire a spatial relative coordinate of the location of the device in real time according to the prior art, and the spatial relative coordinate generally refers to the amount of change relative to the starting point, including numerical changes and direction changes, and the like.

Further, the first acquiring unit 701 may convert the spatial relative coordinate into a geodetic coordinate in real time. Since the geodetic coordinate of the starting point is knowable, and the spatial relative coordinate represents the amount of change relative to the starting point, then based on the starting point and the starting direction, the spatial relative coordinate may be conveniently converted into the geodetic coordinate, which is embodied in the prior art.

When the GNSS signal becomes better, such as when leaving the area where GNSS signals are blocked, the ending point may be set (selected). The selecting method may be as follows: determining a GNSS track point latest collected under the condition that the GNSS signal is good as the ending point, or manually selecting a clearly marked point on the map as the ending point, or the like.

According to the selecting of the ending point, the visual odometer ends its own processing, that is, the first acquiring unit 701 may acquire the coordinate information of the positions between the starting point and the ending point in real time, such as acquire the spatial relative coordinates, and convert the acquired spatial relative coordinates into geodetic coordinates.

The information sending unit 702 may send the acquired geodetic coordinate to the second device, cause the second device to generate a road track in the collecting area according to the acquired geodetic coordinate.

Alternatively, the first acquiring unit 701 may acquire the spatial relative coordinate of the location of the device in real time, and the information sending unit 702 sends the acquired spatial relative coordinate to the second device, causes the second device to convert the acquired spatial relative coordinate into the geodetic coordinate, and generate a road track in the collecting area based on the converted geodetic coordinate.

Figure 8:
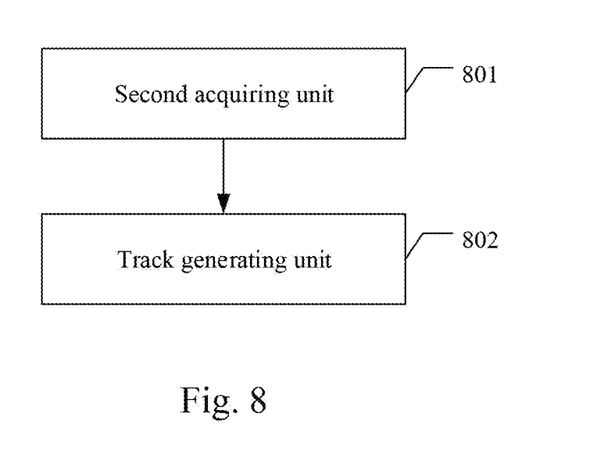
FIG. 8 is a schematic structural diagram of composition of the device for acquiring a road track according to a second embodiment of the present disclosure.

FIG. 8 is a schematic structural diagram of composition of a second embodiment of the device for acquiring a road track according to the present disclosure. As shown in FIG. 8, the device includes a second acquiring unit 801 and a track generating unit 802.

The second acquiring unit 801 is configured to acquire coordinate information from a visual odometer, the coordinate information being coordinate information of a location of visual odometer acquired by the visual odometer in real time when moving in a collecting area, and the collecting area being an area where GNSS signals are blocked.

The track generating unit 802 is configured to generate a road track in the collecting area according to the acquired coordinate information.

The second acquiring unit 801 may acquire a spatial relative coordinate from the visual odometer; and further the track generating unit 802 may convert the spatial relative coordinate into a geodetic coordinate, and generate, according to the converted geodetic coordinate information, the road track in the collecting area.

Alternatively, the second acquiring unit 801 may acquire the geodetic coordinate from the visual odometer, where the geodetic coordinate is acquired by obtaining by the visual odometer a spatial relative coordinate of the location of the visual odometer, and converting by the visual odometer the spatial relative coordinate into the geodetic coordinate in real time by the visual odometer, and then sent to the device for acquiring a road track, and the track generating unit 802 may generate, according to the geodetic coordinate, the road track in the collecting area.

For the specific operating process of the device embodiments shown in FIG. 7 and FIG. 8, reference may be made to the related description in the foregoing method embodiments, and a repeated description thereof will be omitted here.

In summary, according to the solution described in the foregoing device embodiments, an integrated navigation device or the like is not needed, thereby reducing the implementation costs. In addition, the road track in the area where GNSS signals are blocked may be acquired by the visual odometer, thereby improving the positioning accuracy, so that the collected road track can be attached to the existing road network.

Figure 9:
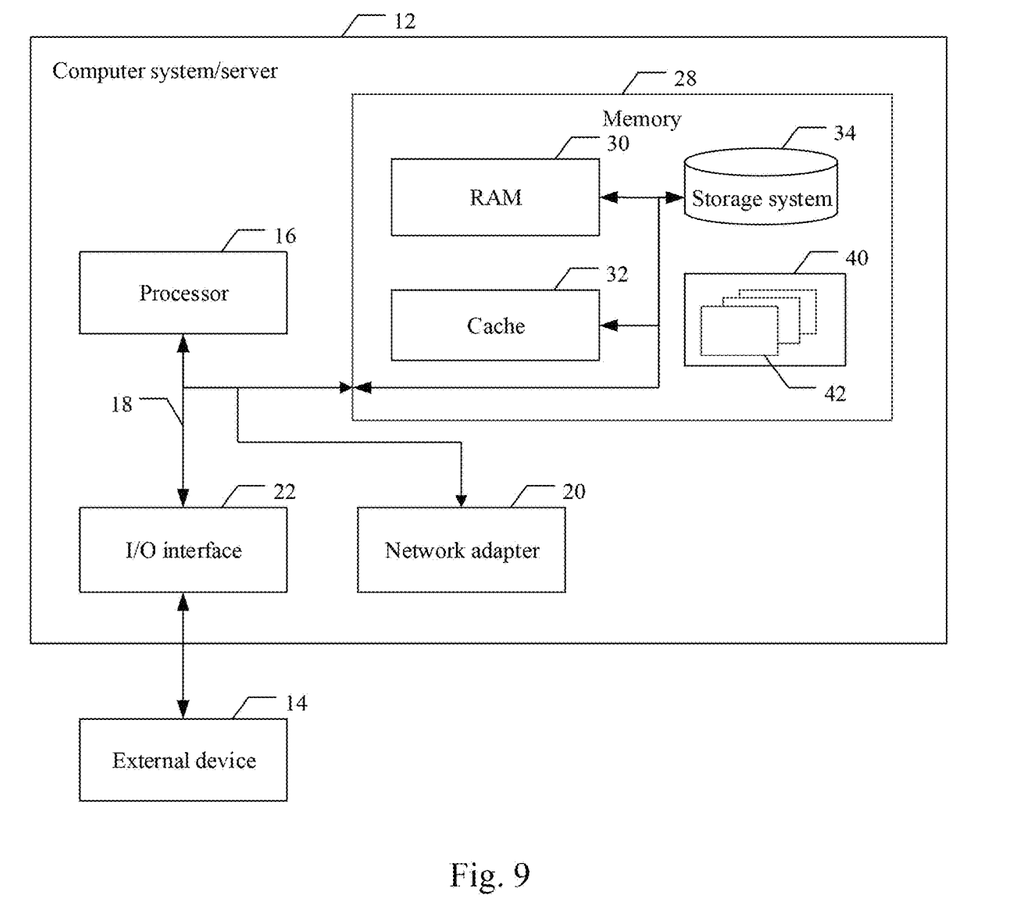
FIG. 9 shows a block diagram of an exemplary computer system/server 12 adapted to implement embodiments of the present disclosure.

FIG. 9 shows a block diagram of an exemplary computer system/server 12 adapted to implement embodiments of the present disclosure. The computer system/server 12 as shown in FIG. 9 is merely an example and should not impose any limitation on the function and scope of use of the embodiments of the present disclosure.

As shown in FIG. 9, the computer system/server 12 is embodied in the form of a general-purpose computing device. The components of the computer system/server 12 may include, but not limited to, one or more processors (processing units) 16, a memory 28, and a bus 18 that connects different system components, including the memory 28 and the processor 16.

The bus 18 represents one or more of several types of bus structures, including a memory bus or memory controller, a peripheral bus, a graphics acceleration port, a processor, or a local bus using any of a variety of bus structures. For example, these architectures include, but not limited to, Industry Standard Architecture (ISA) bus, Micro Channel Architecture (MAC) bus, Enhanced ISA bus, Video Electronics Standards Association (VESA) local bus, and Peripheral Component Interconnects (PCI) bus.

The computer system/server 12 typically includes a variety of computer system readable mediums. These mediums may be any available medium that can be accessed by the computer system/server 12, including transitory and non-transitory medium, removable and non-removable medium.

The memory 28 may include computer system readable medium in the form of transitory memory, such as a random access memory (RAM) 30 and/or a cache memory 32. The computer system/server 12 may further include other removable/non-removable, transitory/non-transitory computer system storage mediums. For example, a storage system 34 may be used to read and write non-removable, non-transitory magnetic medium (not shown in FIG. 9, commonly referred to as "hard disk drive"). Although not shown in FIG. 9, a disk drive for reading and writing a removable non-transitory disk (such as a "floppy disk"), and an optical disc drive for reading and writing a removable non-transitory disc (such as a CD-ROM, DVD-ROM or other optical mediums) may be provided. In these cases, each drive may be coupled to the bus 18 via one or more data medium interfaces. The memory 28 may include at least one program product having a set (e.g., at least one) of program modules configured to perform the functions of the various embodiments of the present disclosure.

A program/utility tool 40 having a set (at least one) of program modules 42 may be stored, for example, in the memory 28, such program modules 42 including, but not limited to, an operating system, one or more applications, other program modules and program data, and each of these examples or some combination thereof may include the implementation of a network environment. The program module 42 typically performs the functions and/or method in the described embodiments of the present disclosure.

The computer system/server 12 may also be in communication with one or more external devices 14 (e.g., a keyboard, pointing device, display 24, etc.), and may also be in communication with one or more devices that enable the user to interact with the computer system/server 12, and/or in communication with any device (e.g., a network card, a modem, etc.) that enables the computer system/server 12 to communicate with one or more other computing devices. This communication may take place via an input/output (I/O) interface 22. Also, the computer system/server 12 may also communicate with one or more networks (e.g., a local area network (LAN), a wide area network (WAN), and/or a public network, such as the Internet) through a network adapter 20. As shown in FIG. 9, the network adapter 20 communicates with other modules of the computer system/server 12 via the bus 18. It should be understood that although not shown in the figure, other hardware and/or software modules may be utilized in conjunction with the computer system/server 12, including but not limited to: microcode, device drivers, redundant processing units, external disk drive arrays, RAID systems, tape drives and data backup storage systems.

The processor 16 executes various functional applications and data processing by running programs stored in the memory 28, such as implementing the method in the embodiment as shown in FIG. 1 or FIG. 2.

The present disclosure also discloses a computer readable storage medium, storing a computer program thereon, where the program, when executed by a processor, implements the method in the embodiment as shown in FIG. 1 or FIG. 2.

Any combination of one or more computer readable mediums may be used. The computer readable medium may be a computer readable signal medium or a computer readable storage medium. The computer readable storage medium may be, for example, but not limited to, an electronic, magnetic, optical, electromagnetic, infrared, or semiconductor system, apparatus, or element, or any combination of the above. More specific examples (a non-exhaustive list) of the computer readable storage medium include: an electrical connection with one or more wires, portable computer disk, hard disk, random access memory (RAM), read only memory (ROM), erasable programmable read only memory (EPROM or flash), optical fiber, portable compact disk read only memory (CD-ROM), optical storage device, magnetic storage device, or any suitable combination of the above. In this disclosure, the computer readable storage medium may be any tangible medium that contains or stores a program, and the program may be used by or used in connection with a command execution system, apparatus, or device.

The computer readable signal medium may include data signal in the base band or propagating as parts of a carrier, in which computer readable program codes are carried. The propagating data signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or device.

The program codes contained on the computer readable medium may be transmitted with any suitable medium including but not limited to: wireless, wired, optical cable, RF medium etc., or any suitable combination of the above.

A computer program code for performing operations in the present disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on the user's computer, partially executed on the user's computer, executed as a separate software package, partially executed on the user's computer and partially executed on a remote computer, or completely executed on a remote computer or server. In the circumstance involving a remote computer, the remote computer may be connected to the user's computer through any network, including local area network (LAN) or wide area network (WAN), or may be connected to an external computer (for example, connected through the Internet using an Internet service provider).

In the several embodiments provided by the present disclosure, it should be understood that the disclosed apparatus and method and the like may be implemented in other ways. For example, the apparatus embodiments described above are merely illustrative. For example, the division of the units is only a logical function division, and in the actual implementation, another division method may be possible.

The units described as separate components may or may not be physically separated, and the components displayed as units may or may not be physical units, that is, may be located in one place, or may be distributed to multiple network units. Some or all of the units may be selected according to actual needs to achieve the purpose of the present solution of the embodiments.

In addition, the functional units in the embodiments of the present disclosure may be integrated into one processing unit, or may exist physically separately, or two or more units may be integrated into one unit. The above integrated unit may be implemented in the form of hardware or in the form of hardware plus software functional units.

The above integrated unit implemented in the form of a software functional unit may be stored in a computer readable storage medium. The software functional unit is stored in a storage medium and includes instructions for causing a computer device (which may be a personal computer, a server, or a network device, etc.) or a processor to perform part of the steps of the method of the various embodiments of the present disclosure. The foregoing storage medium includes: a U disk, a mobile hard disk, a read-only memory (ROM), a random access memory (RAM), a magnetic disk, or an optical disk, and various mediums that can store program codes.

The above is only the preferred embodiments of the present disclosure, and is not intended to limit the present disclosure. Any modifications, equivalent substitutions, improvements, etc. within the spirit and principles of the present disclosure, should be included in the scope of protection of the present disclosure.

What is claimed is:

1. A method for generating a road track, the method comprising:
acquiring, by a visual odometer when the visual odometer moving on a road in a collecting area, coordinate information of a location of the visual odometer in real time, the collecting area being an area where Global Navigation Satellite System (GNSS) signals are blocked, wherein the acquiring comprises: acquiring, in real time, spatial relative coordinates of locations of the visual odometer between a location corresponding to a set starting point and a location corresponding to a set ending point in the collecting area, the set starting point and the set ending point are different points manually set on a map covering the road in the collecting area, a set starting direction at the set starting point is manually set on the map covering the road in the collecting area, and a spatial relative coordinate of a location refers to amount of change including numerical change and direction change relative to the location corresponding to the set starting point, wherein the visual odometer moves along the set starting direction at the location corresponding to the set starting point and ends the acquiring the coordinate information at the location corresponding to the set ending point; and sending, by the visual odometer, the coordinate information to a second device, causing the second device to generate a road track on the map covering the road in the collecting area according to the coordinate information, to link the generated road track to an existing road network.

2. The method according to claim 1, wherein
the sending, by the visual odometer, the coordinate information to a second device comprises:
sending, by the visual odometer, the spatial relative coordinate to the second device, causing the second device to convert the spatial relative coordinate into a geodetic coordinate, and generate, according to the converted geodetic coordinate, the road track in the collecting area.

3. The method according to claim 1, wherein the acquiring, by a visual odometer, coordinate information of a location of the visual odometer in real time comprises:
acquiring, by the visual odometer, a spatial relative coordinate of the location of the visual odometer in real time, and converting the spatial relative coordinate into a geodetic coordinate in real time; and
the sending, by the visual odometer, the coordinate information to a second device comprises:
sending, by the visual odometer, the geodetic coordinate to the second device, causing the second device to generate, according to the geodetic coordinate, the road track in the collecting area.

4. The method according to claim 1, wherein the converting the spatial relative coordinate into a geodetic coordinate in real time comprises:
converting the spatial relative coordinate into the geodetic coordinate in real time according to the set starting point and a set starting direction.

5. A method for generating a road track, the method comprising:
acquiring, by a second device, coordinate information from a visual odometer, the coordinate information being coordinate information of a location of the visual odometer acquired by the visual odometer in real time when the visual odometer moving on a road in a collecting area, and the collecting area being an area where Global Navigation Satellite System (GNSS) signals are blocked, wherein the coordinate information are spatial relative coordinates of positions between a location corresponding to a set starting point and a location corresponding to a set ending point, the spatial relative coordinates are collected by the visual odometer in real time, the set starting point and the set ending point are different points manually set on a map covering the road in the collecting area, a set starting direction at the set starting point is manually set on the map covering the road in the collecting area, and a spatial relative coordinate of position refers to amount of change including numerical change and direction change relative to the location corresponding to the set starting point wherein the visual odometer moves along the set starting direction at the location corresponding to the set starting point and ends the acquiring the coordinate information at the location corresponding to the set ending point; and generating, by the second device, a road track on the map covering the road in the collecting area according to the coordinate information, to link the generated road track to an existing road network.

6. The method according to claim 5, wherein the acquiring, by a second device, coordinate information from a visual odometer comprises:
acquiring, by the second device, a spatial relative coordinate from the visual odometer; and
the generating, by the second device, a road track in the collecting area according to the coordinate information comprises:
converting, by the second device, the spatial relative coordinate into a geodetic coordinate, and generating, according to the converted geodetic coordinate, the road track in the collecting area.

7. The method according to claim 5, wherein the acquiring, by a second device, coordinate information from a visual odometer comprises:
acquiring, by the second device, a geodetic coordinate from the visual odometer, wherein the geodetic coordinate is acquired by obtaining by the visual odometer a spatial relative coordinate of the location of the visual odometer, and converting by the visual odometer the spatial relative coordinate into the geodetic coordinate in real time, and then sent to the second device; and
the generating, by the second device, a road track in the collecting area according to the coordinate information comprises:
generating, by the second device, according to the geodetic coordinate, the road track in the collecting area.

8. A device for generating a road track, the device comprising:
at least one processor; and
a memory storing instructions, wherein the instructions when executed by the at least one processor, cause the at least one processor to perform operations, the operations comprising:
acquiring, when the device moving on a road in a collecting area, coordinate information of a location of the device in real time, the collecting area being an area where Global Navigation Satellite System (GNSS) signals are blocked, wherein the acquiring comprises: acquiring, in real time, spatial relative coordinates of locations of the visual odometer between a location corresponding to a set starting point and a location corresponding to a set ending point in the collecting area, the set starting point and the set ending point are different points manually set on a map covering the road in the collecting area, a set starting direction at the set starting point is manually set on the map covering the road in the collecting area, and a spatial relative coordinate of a location refers to amount of change including numerical change and direction change relative to the location corresponding to the set starting point, wherein the visual odometer moves along the set starting direction at the location corresponding to the set starting point and ends the acquiring the coordinate information at the location corresponding to the set ending point; and
sending the coordinate information to a second device, causing the second device to generate a road track on the map covering the road in the collecting area according to the coordinate information, to link the generated road track to an existing road network.

9. The device for acquiring a road track according to claim 8, wherein the sending, by the visual odometer, the coordinate information to a second device comprises: sending the spatial relative coordinate to the second device, causing the second device to convert the spatial relative coordinate into a geodetic coordinate, and generate, according to the converted geodetic coordinate, the road track in the collecting area.

10. The device for acquiring a road track according to claim 8, wherein the acquiring, by a visual odometer, coordinate information of a location of the visual odometer in real time comprises:
acquiring a spatial relative coordinate of the location of the device in real time, and converting the spatial relative coordinate into a geodetic coordinate in real time; and
the sending, by the visual odometer, the coordinate information to a second device comprises: sending the geodetic coordinate to the second device, causing the second device to generate, according to the geodetic coordinate, the road track in the collecting area.

11. The device for acquiring a road track according to claim 8, wherein the converting the spatial relative coordinate into a geodetic coordinate in real time comprises: converting the spatial relative coordinate into the geodetic coordinate in real time according to the set starting point and a set starting direction.

12. A device for acquiring a road track, the device comprising:
at least one processor; and
a memory storing instructions, wherein the instructions when executed by the at least one processor, cause the at least one processor to perform operations, the operations comprising:
acquiring coordinate information from a visual odometer, the coordinate information being coordinate information of a location of the visual odometer acquired by the visual odometer in real time when the visual odometer moving on a road in a collecting area, and the collecting area being an area where Global Navigation Satellite System (GNSS) signals are blocked, wherein the coordinate information are spatial relative coordinates of positions between a location corresponding to a set starting point and a location corresponding to a set ending point, the spatial relative coordinates are collected by the visual odometer in real time, the set starting point and the set ending point are different points manually set on a map covering the road in the collecting area, a set starting direction at the set starting point is manually set on the map covering the road in the collecting area, and a spatial relative coordinate of position refers to amount of change including numerical change and direction change relative to the location corresponding to the set starting point, wherein the visual odometer moves along the set starting direction at the location corresponding to the set starting point and ends the acquiring the coordinate information at the location corresponding to the set ending point; and
generating a road track on the map covering the road in the collecting area according to the coordinate information, to link the generated road track to an existing road network.

13. The device for acquiring a road track according to claim 12, wherein the acquiring, by a second device, coordinate information from a visual odometer comprises:
acquiring a spatial relative coordinate from the visual odometer; and the generating, by the second device, a road track in the collecting area according to the coordinate information comprises: converting the spatial relative coordinate into a geodetic coordinate, and generating, according to the converted geodetic coordinate, the road track in the collecting area.

14. The device for acquiring a road track according to claim 12, wherein the acquiring, by a second device, coordinate information from a visual odometer comprises:
acquiring a geodetic coordinate from the visual odometer, wherein the geodetic coordinate is acquired by obtaining by the visual odometer a spatial relative coordinate of the location of the visual odometer, and converting by the visual odometer the spatial relative coordinate into the geodetic coordinate in real time, and then sent to the device for acquiring the road track; and
the generating, by the second device, a road track in the collecting area according to the coordinate information comprises: generating, according to the geodetic coordinate, the road track in the collecting area.

\* \* \* \* \*